United States Patent [19]
Burkowitz

[11] 3,892,921
[45] July 1, 1975

[54] METHOD AND APPARATUS FOR MONITORING RECORDING LEVEL

[75] Inventor: Peter Klaus Burkowitz, Iserhagen NBS, Germany

[73] Assignee: Polygram GmbH, Germany

[22] Filed: Jan. 15, 1973

[21] Appl. No.: 323,647

[30] Foreign Application Priority Data
Jan. 18, 1972  Germany............................ 2202244

[52] U.S. Cl. ......... 179/1 MN; 324/103 R; 324/114; 360/31
[51] Int. Cl............................................ H04r 29/00
[58] Field of Search........ 179/1 MN, 1 P, 1 B, 1 G; 181/.5 AP; 324/114, 140, 73 R, 103 R, 103 P; 360/31

[56] References Cited
UNITED STATES PATENTS

| | | | |
|---|---|---|---|
| 2,341,706 | 2/1944 | Fields | 179/1 MN |
| 2,588,209 | 3/1952 | Crapuchettes | 324/140 R |
| 2,816,281 | 12/1957 | Aronson | 179/1 N |
| 2,998,570 | 8/1961 | Bricaud | 324/114 |
| 3,031,528 | 4/1962 | Bolston | 179/1 N |

Primary Examiner—Kathleen H. Claffy
Assistant Examiner—Douglas W. Olms
Attorney, Agent, or Firm—Hill, Gross, Simpson, Van Santen, Steadman, Chiara & Simpson

[57] ABSTRACT

In apparatus for monitoring the recording level of signals derived from a plurality of independent channels, an instrument is provided for visually indicating the maximum recording level of any of the channels being recorded, such instrument being located in close visual association with a plurality of indicators for indicating the recording levels of individual channels.

7 Claims, 2 Drawing Figures

METHOD AND APPARATUS FOR MONITORING RECORDING LEVEL

BACKGROUND OF THE INVENTION

1. Field of the Invention

The present invention relates to a method and apparatus for monitoring recording levels of signals derived from a plurality of independent channels.

2. The Prior Art

In sound recording it is the general practice to employ a number of microphones for producing independent and individual signals corresponding to a musical performance, or the like, and the output of each microphone is recorded on separate tracks of magnetic tape or the like. Subsequently, the several magnetic tape tracks are played back, and a composite signal is derived from all of the separate tracks, and the composite signal is recorded on a single track of a record medium, such as magnetic tape or the like. When stereo or quadraphonic signals are recorded, there are two or four composite output signals, which are recorded on either two tracks or four tracks of the magnetic tape.

The multi-track technique, although allowing great flexibility in producing desired characteristics of the composite signal or signals, presents some practical difficulties in the monitoring of the levels of each of the various mixing channels, because of the large number of channels employed, e.g. one for each microphone. The levels of these individual channels have to be continuously and simultaneously monitored in order to prevent the channels from exceeding the peak level which can satisfactorily be recorded on the allocated track of the recording medium. When, for example, 16 channels are being employed for 16 different microphones, it is extremely difficult to monitor the signal levels in every one of the 16 channels. Primarily, this difficulty is due to the design of the conventionally used volume measuring devices, viz., VU meters, which have relatively large dimensions so that indications of the levels of the 16 channels are spread over a very wide area and it is not possible to observe at a glance the readings of all of the 16 measuring devices. Thus, excessive levels sometimes persist longer than desired before they can be detected and corrected by conventional techniques.

SUMMARY OF THE INVENTION

It is a principal object of the present invention to provide for the monitoring of the maximum level of any of the channels being recorded and the individual channel levels in a multi-channel recording system, by employing an arrangement by which one can readily and easily detect peaks in the levels of individual channels.

This and other objects and advantages of the present invention will become manifest upon an examination of the accompanying drawings and the following description.

In one embodiment of the present invention there is provided apparatus for monitoring a multi-channel recording including a meter for indicating the maximum level of any of the channels being recorded and a plurality of indicators for indicating an excessive signal level of the individual channels, the indicators being located in close visual association with the meter.

BRIEF DESCRIPTION OF THE DRAWINGS

Reference will now be made to the accompanying drawings in which.

DESCRIPTION OF THE PREFERRED EMBODIMENT

Figure 1:
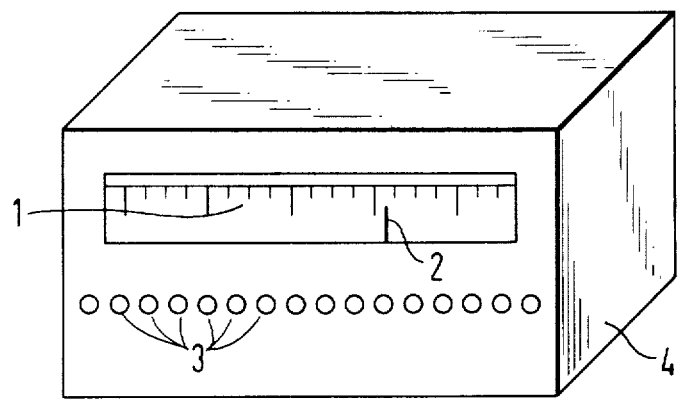
FIG. 1 is a perspective view of a recording level monitoring device constructed in accordance with an illustrative embodiment of the present invention.

FIG. 1 illustrates a recording level monitoring device 4 for monitoring and indicating the levels of multi-channel signals during the process of recording such signal. The monitoring device 4 is preferably used in a director's console, or a mixer console, and on its front panel it has a meter 1 with a scale marked off in volume units or the like, and a pointer 2 for indicating the instantaneous maximum level of any of the channels being recorded. The meter 1 is responsive to the maximum level resulting from any of the individual channels which make up the output signals or the composite output signal, respectively.

Beneath the meter 1, a row of 16 indicators 3 is provided, one for each of 16 separate channels. The indicators 3 are arranged closely together in the same field of view as the meter 1, in close visual association therewith, so that the meter 1 and all of the indicators 3 can readily be observed at a glance. The indicators 3 are preferably threshold devices in the form of lamps or the like which are adapted to be illuminated when a predetermined threshold level has been exceeded by the signals of the channels to which they are connected. If the signal to which each of the indicators 3 is responsive does not exceed the predetermined threshold level, it remains unilluminated.

In a modified form of the invention the indicators 3 are narrow profile instruments, so that they may be located in close side-by-side arrangement within a small area. Alternatively, glow-discharge lamps, luminescent diodes or the like, may be employed for the indicators 3, arranged in close association with each other, as shown in FIG. 1.

Figure 2:
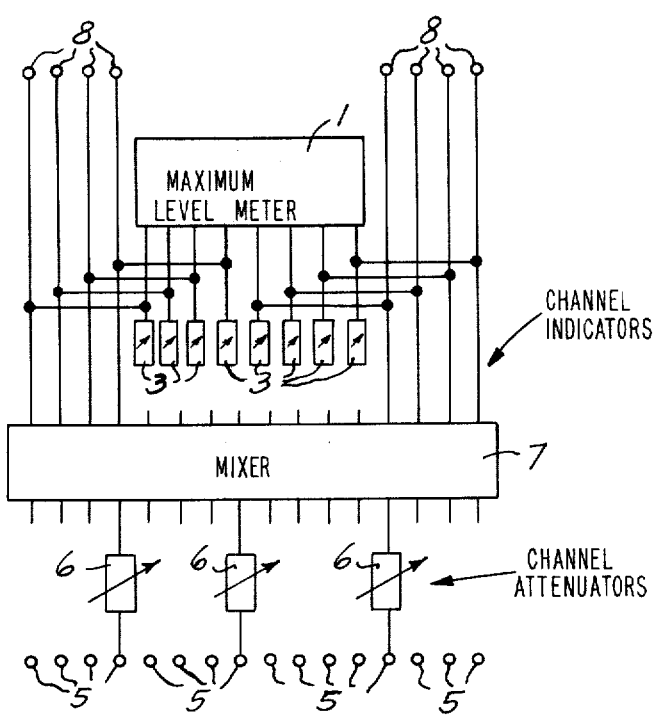
FIG. 2 is a functional block diagram, illustrating one arrangement for the electrical interconnection of the meter and the indicators.

FIG. 2 shows in functional block diagram form, one circuit for interconnecting the meter 1 and indicators 3. In the interest of simplicity, connections to only three channels are shown. A series of input terminals 5, connected independently to various input channels, are connected through individual variable attenuators 6 to the inputs of a mixing device 7. The outputs of the mixing device 7 are applied to terminals 8, at which are presented the signals produced by mixing the signals provided on the input terminals 5. In the interest of simplicity, only eight outputs are shown. The level of the signal for each channel is controlled by manual adjustment of its respective attenuator 6. The meter 1 is connected to the outputs of the mixer 7 to indicate the instantaneous maximum value of any of the output signals applied to the terminals 8.

The indicators 3 are each connected individually to one of the output terminals 8 to indicate the level of the signal of that channel. Thus, the indicators 3 all indicate individual output signals, while the meter 1 indicates the maximum value of any of the output signals.

Although the circuit arrangement of FIG. 2 is one which provides a plurality of output signals at the terminals 8, other arrangements will be obvious to those skilled in the art by which separate mixers are provided for different combinations of the input channels, and have their inputs connected to the corresponding combinations of the input terminals 5. Each mixer then produces a separate composite output channel, which may be employed, for example, in stereo and quadraphonic recording. Preferably an additional indicator 3 is provided for monitoring the output of each mixer and the meter 1 is connected with the outputs of all the mixers so as to indicate the maximum level of any of the composite output signals.

In any case, the meter 1 and the indicators 3 are located close together on the front panel of the device 4 so that whenever an excessive peak signal is indicated by the meter 1, the operator can immediately and readily determine which of the channels is responsible for the high level, and make an appropriate adjustment.

What is claimed is:

1. A method of monitoring a multi-channel recording comprising the steps of providing a meter for indicating the instantaneous maximum level of any of the output signals formed of signals from a plurality of input channels, providing a plurality of indicators for indicating the individual levels of the signals on said channels, and arranging said meter and said indicators in close visual proximity to each other.

2. The method according to claim 1, including the step of mounting said meter and said indicators closely together on a panel.

3. A level monitoring device for monitoring the level of the multi-channel recording, including a meter for indicating the instantaneous maximum level of any of the output signals formed of signals from a plurality of channels, and a plurality of indicators, each of said indicators indicating the signal level of an individual channel, said meter and indicators being located in close visual proximity to each other.

4. Apparatus according to claim 3, including a common housing for said meter and said indicators.

5. Apparatus according to claim 2 wherein said indicators comprise narrow profile instruments disposed closely together within a single field of view.

6. Apparatus according to claim 2 wherein said indicators comprise glow-discharge lamps, said lamps being illuminated when a predetermined threshold is exceeded by the signal of the channel to which it is connected.

7. Apparatus according to claim 2, wherein said indicators comprise luminescent diodes adapted to emit light energy in response to the signal level of the channels exceeding a predetermined threshold level.

* * * * *